United States Patent
Xiao

(10) Patent No.: US 9,027,725 B2
(45) Date of Patent: May 12, 2015

(54) DRIVING DEVICE FOR BELT AXLE OF WINCH

(75) Inventor: Zhaoyin Xiao, Zhejiang Province (CN)

(73) Assignee: Zhejiang Topsun Logistic Control Co., Ltd., Taizhou (CN)

(*) Notice: Subject to any disclaimer, the term of this patent is extended or adjusted under 35 U.S.C. 154(b) by 208 days.

(21) Appl. No.: 13/295,072

(22) Filed: Nov. 13, 2011

(65) Prior Publication Data

US 2012/0317763 A1  Dec. 20, 2012

(30) Foreign Application Priority Data

May 3, 2011 (CN) .......................... 2011 1 0112450

(51) Int. Cl.
  *F16D 11/14* (2006.01)
  *F16D 41/18* (2006.01)
  *B66D 1/02* (2006.01)
  *B60P 7/08* (2006.01)

(52) U.S. Cl.
  CPC ................ *B60P 7/083* (2013.01); *F16D 41/18* (2013.01); *F16D 11/14* (2013.01); *Y10T 24/2175* (2013.01); *B66D 1/02* (2013.01)

(58) Field of Classification Search
  CPC ....... F16D 41/12; F16D 41/18; F16D 41/125; F16D 11/04; F16D 11/10; F16D 11/12; F16D 11/14; F16D 2011/008; B66D 1/02; B66D 1/04; B60P 7/08; B60P 7/083
  USPC ......... 192/46, 69.8; 24/68 CD; 410/100, 103; 254/243, 254
  See application file for complete search history.

(56) References Cited

U.S. PATENT DOCUMENTS

| 4,045,001 A | 8/1977 | Harvey, Jr. |
| 2004/0013490 A1 | 1/2004 | Cauchon |
| 2010/0300225 A1* | 12/2010 | Ruan .............................. 74/142 |

FOREIGN PATENT DOCUMENTS

| CN | 2066437 U | 11/1990 |
| CN | 2207471 Y | 9/1995 |
| CN | 2477602 Y | 2/2002 |
| CN | 2894891 Y | 5/2007 |
| CN | 200910098982.1 | 11/2009 |
| EP | 1758762 B1 | 11/2007 |

* cited by examiner

*Primary Examiner* — Robert Hodge
*Assistant Examiner* — Colby M Hansen
(74) *Attorney, Agent, or Firm* — Minder Law Group; Willy H. Wong

(57) ABSTRACT

The present invention discloses a driving device for a belt axle of a winch, which addresses the problems existing in conventional winches, for example the driving devices being out of work attributing to wearing of the unidirectional teeth on the fixed base and rotary body of the winch. The rotary cylinder of the driving device of the invention is provided with insertion holes into which a crow bar can be inserted. The fixed base is fixedly connected with the belt axle of the winch. The rotary cylinder is covered on the fixed base and fixed thereto in the axial direction. A unidirectional mechanism is located between the rotary cylinder and the belt axle to be engaged by unidirectional teeth. As the shift element and shift plates can be conveniently removed, the worn shift plates or shift element can be conveniently replaced after being used for a long period.

12 Claims, 4 Drawing Sheets

DRIVING DEVICE FOR BELT AXLE OF WINCH

BACKGROUND OF THE INVENTION

1. Field of Invention

The present invention relates to a winch, in particular, a driving device for a belt axle of a winch in the field of mechanics.

2. Related Art

Goods usually desire to be bound by using the winch which is frequently employed for transportation of goods by vehicles, to prevent the goods falling off or colliding with each other during travel of vehicles. The winch includes a support, a rotation shaft on the support and a binding belt connected to the rotation shaft. The rotation shaft is turned to tighten the binding belt for binding the goods. It is understood the goods could be bound by means of the winch safely and conveniently, which plays an important role in transportation of goods by vehicles.

For example, the applicant once filed a Chinese Utility Model Patent No. 201457211U with the title of "Driving Mechanism for Belt Axle of Winch". The driving mechanism is located at the protrusion end of the belt axle on the side of the support of the winch. The mechanism includes a fixed base and a rotary body. The fixed base is connected with the protrusion end of the belt axle. The rotary body is covered on the fixed base. A spring is provided between the rotary body and the fixed base. The end of the fixed base abuts against the end of the rotary body with the elastic force of the spring.

Obviously, the unidirectional teeth could be configured in such a manner that the fixed base could only move in one single direction while the rotary body is turned in a forward direction and prevented from moving in an opposite direction while the rotary body is turned in a backward direction. Therefore, the belt axle is driven to rotation to tighten the binding belt finally.

However, the unidirectional teeth of the fixed base and rotary body might be worn if the winch has been used for a long period. The driving mechanism would be out of use once it is worn down. Therefore, the driving mechanism has a shorter life in user and a higher use cost.

SUMMARY OF THE INVENTION

One object of the invention is to provide a driving device for a belt axle of a winch with higher applicability and enhanced stability.

Said object of the invention could be achieved by a driving device for a belt axle of a winch positioned at the end of the belt axle, comprising a fixed base and a rotary cylinder. Said rotary cylinder is provided with insertion holes into which a crow bar could be inserted. The fixed base is fixedly connected with the belt axle of the winch. Said rotary cylinder could be covered on the fixed base and fixed thereto in the axial direction. A unidirectional mechanism is located between the rotary cylinder and the belt axle to be engaged by unidirectional teeth. The belt axle could continuously rotate in one single direction by means of the said unidirectional mechanism while said rotary cylinder rotates in a forward direction. The unidirectional teeth prevents the belt axle from rotating in an opposite direction when the rotary cylinder ceases rotating or rotates in a backward direction.

According to the driving device for the belt axle of the winch of the invention, the crow bar is inserted into the insertion holes and then turned forwards and backwards, which drives the rotary cylinder to rotate in the forward direction and the backward direction, respectively. In this process, the belt axle of the winch is limited to rotate in one single direction by means of the unidirectional mechanism, so that the binding belt is tightened.

According to the driving device for the belt axle of the winch of the invention, the fixed base is fixedly connection with the belt axle by welding.

The fixed base would be fixedly connected with the belt axle of the winch in a firm manner by welding.

According to the driving device for the belt axle of the winch of the invention, the unidirectional mechanism has several ratchet teeth at the end of the belt axle and bar-shape slots opened along the axial direction on the sides of the rotary cylinder. Shift plates are set in and could move along said bar-shape slots. The shift plates could be embedded into said ratchet teeth.

As the shift plates keep being embedded into the ratchet teeth during movement of the bar-shape slots, the ratchet teeth could be pulled in one single direction by the shift plates.

According to the driving device for the belt axle of the winch of the invention, both ends of the shift plates have projected connection heads, and both connection heads are embedded into the corresponding bar-shape slots respectively.

The connection heads are embedded into the bar-shape slots in such a way that the ends of the shift plates could be positioned and the shift plates could move along the bar-shape slots in the meantime.

According to the driving device for the belt axle of the winch of the invention, a baffle is fixed within the inner cylinder. A spring is located between the baffle and the shift plates. The shift plates could be embedded into the ratchet teeth with the elastic force of the spring.

The shift plates remain to be embedded into the ratchet teeth under the elastic force of the spring.

According to the driving device for the belt axle of the winch of the invention, the shift plates have a spring seat for positioning the spring. One end of the said spring is disposed at the spring seat.

The spring could be prevented being displaced or falling off when pressed as it is positioned by the spring seat.

According to the driving device for the belt axle of the winch of the invention, the rotary cylinder includes an inner cylinder and an outer cylinder. The inner cylinder is fixed within the outer cylinder. Said bar-shape slots are positioned on both sides of the inner cylinder. Said baffle could be fixed within the inner cylinder. Said insertion holes pass through both the inner cylinder and the outer cylinder.

The shift plates are connected to the inner cylinder, so that the outer cylinder outside of the inner cylinder could prevent the shift plates falling off. Here the inner cylinder is fixedly connected with the outer cylinder by welding.

According to the driving device for the belt axle of the winch of the invention, there are 2-8 shift plates. The number of the bar-shape slots on the inner cylinder is the same as that of the shift plates and the positions of the bar-shape slots are corresponding to those of the shift plates.

According to the driving device for the belt axle of the winch of the invention, the outer cylinder has a raised edge projecting out at the end thereof. The outer cylinder is covered with a platen. The platen is connected with the fixed base by means of a securing member. The raised edge could be provided between the platen and the fixed base. In this connection, the rotary cylinder is axially fixed to the fixed base.

According to the driving device for the belt axle of the winch of the invention, the inner cylinder has a connection part matched with the internal diameter of the belt axle at the end thereof. The connection part of the inner cylinder could be located within the belt axle.

The inner cylinder is partly embedded into the belt axle, which could take the positioning and supporting functions. As such, the rotary cylinder could be prevented from rotating unstably thanks to deviation from the center of the belt axle.

According to the driving device for the belt axle of the winch of the invention, a seal ring is disposed between the platen and the outer cylinder. A seal pad is disposed between the platen and the fixed base. A groove is provided on the inner side of the platen. Said seal ring is located at the groove of the platen. The shift plates could be sealingly connected with the outer cylinder by means of the seal ring. In addition, the unstable rotation of the outer cylinder arising out of the over-large spacing between the shift plates and the outer cylinder, could be avoided because of the seal ring. The seal ring is made from rubber materials.

The shift plates and fixed base are sealed by the seal pad. Obviously the lubricating oil would leak in the driving device by means of the seal ring and seal pad. The seal pad is made from rubber materials.

Compared with the prior art, the shift plates could be conveniently removed in the driving device for the belt axle of the winch of the invention, in which case the shift plates could be conveniently replaced even if they are worn after being used for a long period. Therefore, the driving device has a low use cost and an improved applicability.

The shift plates could slide up and down in a smooth and stable manner thanks to the outer and inner layers of the rotary cylinder. Therefore, the driving device presents high stability in use and a high practical value.

Furthermore, the components of the driving device are manufactured by stamping, which improves the production efficiency, decreases the production cost, reduces the weight of the product and enhances the stability of the product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The winch is a tool generally used in transportation of goods by vehicle. The winch is employed to bind the goods, so as to prevent the goods from falling off or colliding with each other during travel of the vehicles.

Figure 1:
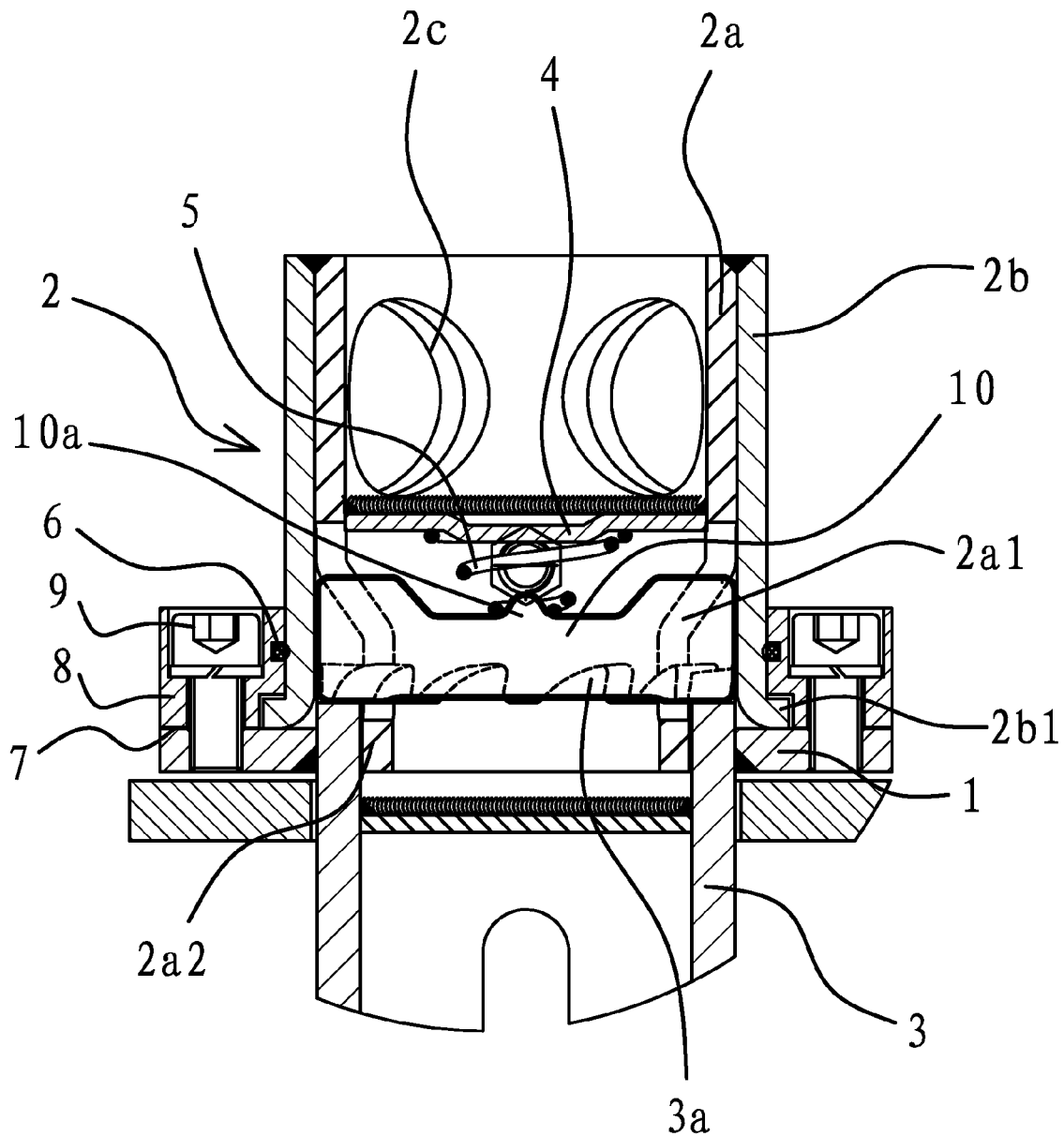
FIG. 1 is a sectional view of a first configuration of the driving device for a belt axle of a winch of the invention, shown with a shift plate in the foreground.

As shown in FIG. 1, the driving device for a belt axle of a winch of the invention is used for turning the belt axle in the winch. The driving device is disposed at the end of the belt axle 3 of the winch.

The device of the invention includes a fixed base 1 and a rotary cylinder 2 which is provided with insertion holes 2c. The fixed base 1 is fixedly connected to the belt axle 3 of the winch by welding. The belt axle is provided with ratchet teeth at the end thereof.

Figure 2:
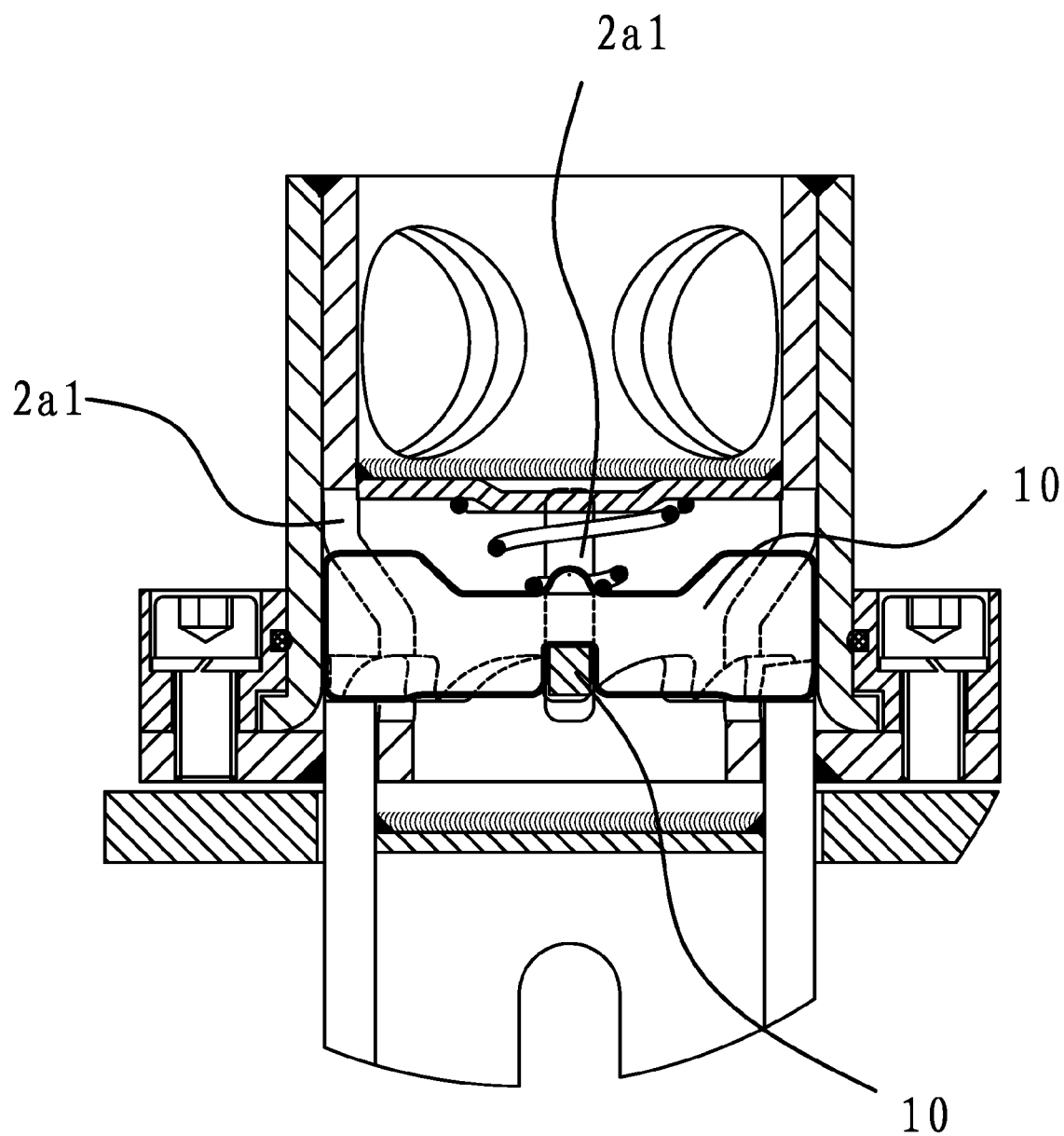
FIG. 2 is a section view of a second configuration of the driving device for the belt axle of the winch, shown with a shift plate in the foreground.
Figure 3:
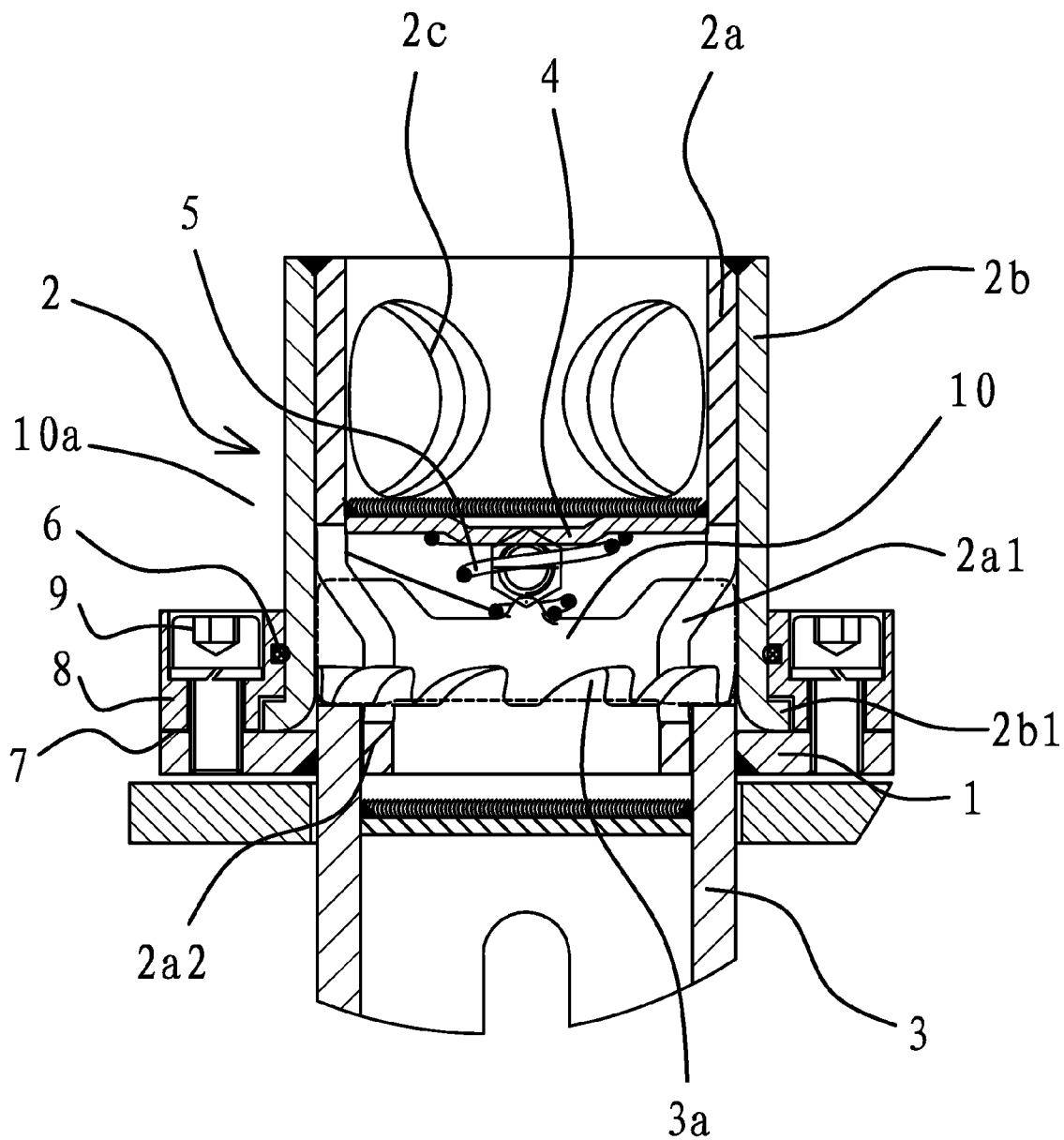
FIG. 3 is a sectional view of a first configuration of the driving device for a belt axle of a winch of the invention, shown with a shift plate in the background.
Figure 4:
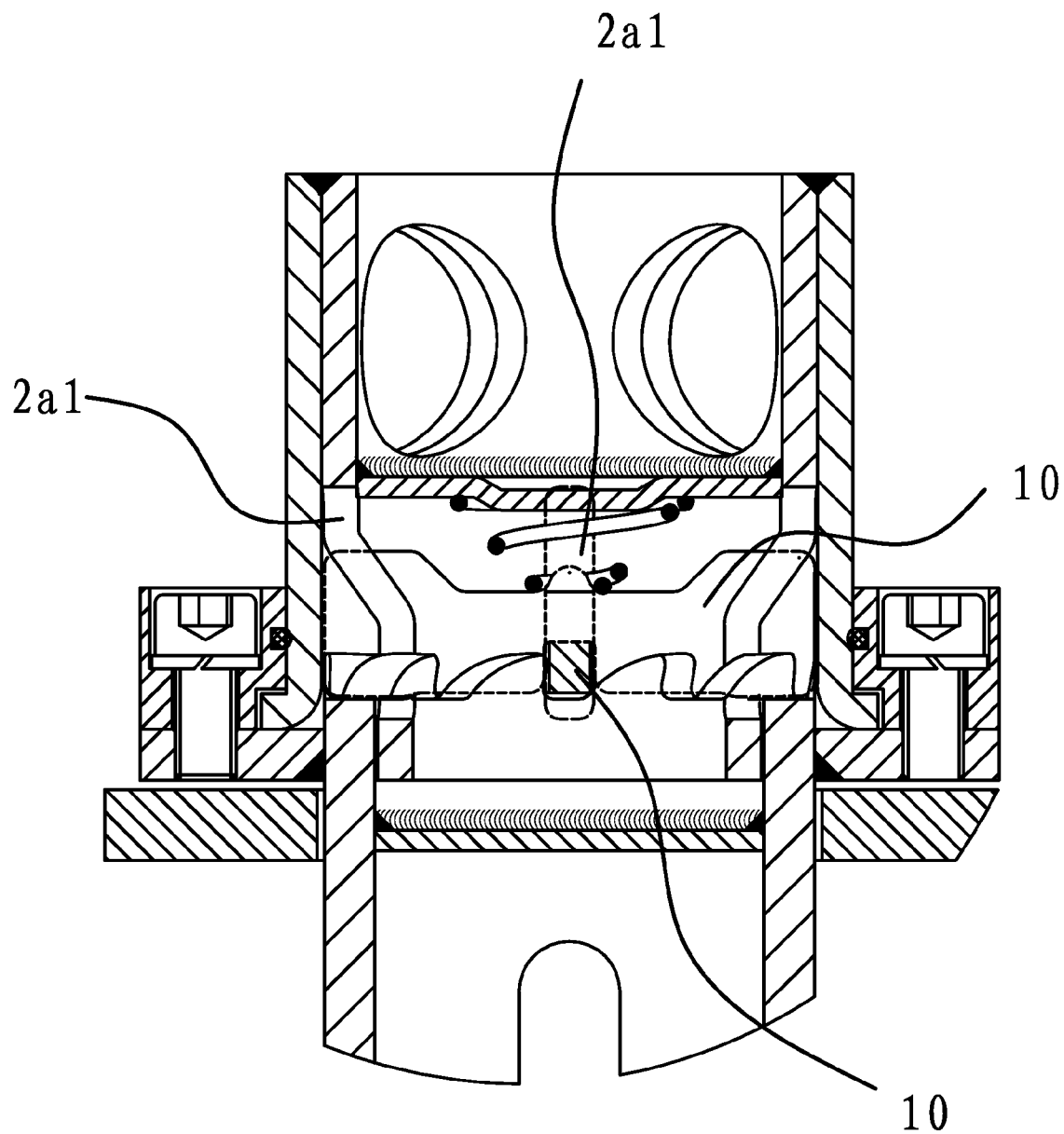
FIG. 4 is a section view of another a second configuration of the driving device for the belt axle of the winch, shown with a shift plate in the background.

Referring to FIG. 1, the rotary cylinder 2 is covered on the fixed base 1 and fixed thereto in the axial direction. The rotary cylinder 2 is provided with bar-shape slots 2a1 along the axial direction on the sides. Shift plates 10 are set in and could move along the bar-shape slots 2a1. The shift plates 10 are embedded into the ratchet teeth. In this embodiment, the rotary cylinder 2 has an inner cylinder 2a and an outer cylinder 2b. The inner cylinder 2a is fixed within the outer cylinder 2b by welding. Said bar-shape slots 2a1 s are located on both sides of the inner cylinder 2a. The shift plates 10 have projected connection heads at both ends and two connection heads are embedded into corresponding bar-shape slots 2a1. A baffle 4 is fixed within the inner cylinder 2a. The insertion holes 2c into which the crow bar could be inserted, pass through both the inner cylinder 2a and outer cylinder 2b. In order to improve the stability of the belt axle in rotation, two shift plates 10 could be provided. The number of the bar-shape slots 2a1 is the same as that of the shift plates 10 and the positions of the bar-shape slots 2a1 are corresponding to those of the shift plates 10, as shown in FIG. 2.

A spring 5 is located between the baffle 4 and shift plates 10. The shift plates are embedded into the ratchet teeth with the elastic force of the spring 5. In this embodiment, the shift plates 10 have a spring seat 10a for positioning the spring 5. One end of the said spring 5 is disposed at the spring seat 10a, and the other end of the spring 5 is pressed against the baffle 4.

Meanwhile, the outer cylinder 2b has a raised edge 2b1 projecting out at the end thereof. The outer cylinder 2b is covered with a platen 8. The platen 8 is connected with the fixed base 1 by means of a securing member 9, and the raised edge 2b1 is provided between the platen 8 and the fixed base 1. The inner cylinder 2a has a connection part 2a2 matched with the internal diameter of the belt axle 3 at the end thereof, and the connection part 2a2 of the inner cylinder 2a is located within the belt axle 3. In this embodiment, a seal ring 6 is disposed between the platen 8 and the outer cylinder 2b, and a seal pad 7 is disposed between the platen 8 and the fixed base 1. In said embodiment, the seal pad 7 and seal ring 6 are made from rubber materials.

When the binding belt is to be tightened in the winch having the driving device of the invention, the crow bar is inserted into the insertion holes 2c, and is turned forwards and backwards while the crow bar remains inserted. In this case, the rotary cylinder 2 would rotate in a clockwise direction and in an anti-clockwise direction. When the rotary cylinder 2 swings in the clockwise direction, the shift plates 10 slide along the ratchet teeth against the elastic force of the spring 5. In this regards, the belt axle 3 would not be driven to rotate when the rotary cylinder 2 is turned. When the rotary cylinder 2 swings in the anti-clockwise direction, the shift plates 10 are stopped by the ratchet teeth, in which case the belt axle 3 is driven to rotate when the rotary cylinder 2 is turned. It is obvious that the belt axle 3 would be rotate in one single direction while the rotary cylinder 2 is driven by the crow bar to rotate in a clockwise direction and in an anti-clockwise direction. Therefore, the binding belt of the winch would be ultimately tightened on the belt axle 3.

Although technical terms are used herein, such as fixed base 1, rotary cylinder 2 and belt axle 3, the other similar terms could also be used. These terms are merely used to describe and explain the essence of the invention more conveniently, and any limitation to said terms is regarded as departing from the spirit of the invention.

LIST OF REFERENCE NUMERALS

1 fixed base
2 rotary cylinder
2a inner cylinder
2a1 bar-shape slot
2b outer cylinder
2b1 raised edge
3 belt axle
3a ratchet tooth
4 baffle
5 spring
6 seal ring
7 seal pad
8 platen
9 securing member
10 shift plate
10a spring seat

What is claimed is:

1. A driving device positioned at an end of a belt axle (3) of a winch, comprising:
   a base (1) fixedly connected to the belt axle (3), the belt axle (3) having an axial direction;
   a rotary cylinder (2) with insertion holes (2c) through which a crow bar is capable of being inserted, the rotary cylinder (2) is sleeved on the fixed base (1) and fixed thereto in the axial direction;
   a unidirectional mechanism disposed between the rotary cylinder (2) and the belt axle (3), the unidirectional mechanism having several ratchet teeth (3a) at the end of the belt axle (3);
   bar-shape slots (2a1) opened along the axial direction on sides of the rotary cylinder (2);
   at least one shift plate (10) is set in the bar-shape slots (2a1) and is capable of moving along the bar-shape slots (2a1), the shift plate (10) biased between the ratchet teeth (3a) by an elastic force of a spring (5);
   wherein the belt axle (3) rotates in one single direction by means of the unidirectional mechanism as the rotary cylinder (2) rotates in a forward direction.

2. The driving device as claimed in claim 1, wherein the belt axle (3) does not rotate in a direction opposite of the one single direction when the rotary cylinder (2) rotates in a backward direction.

3. The driving device as claimed in claim 2, characterized in that, two ends of the shift plate (10) have projected connection heads, and two connection heads are inserted into the corresponding bar-shape slots (2a1) respectively.

4. The driving device for the belt axle of the winch as claimed in claim 3, characterized in that, the shift plate (10) have a spring seat (10a) for positioning the spring (5), one end of the said spring (5) is disposed at the spring seat (10a).

5. The driving device for the belt axle of the winch as claimed in claim 3, characterized in that, the rotary cylinder (2) includes an inner cylinder (2a) and an outer cylinder (2b), the inner cylinder (2a) is fixed within the outer cylinder (2b), said bar-shape slots (2a1) are positioned on both sides of the inner cylinder (2a), a baffle (4) is fixed within the inner cylinder (2a), and said insertion holes (2c) pass through both the inner cylinder (2a) and the outer cylinder (2b).

6. The driving device for the belt axle of the winch as claimed in claim 5, characterized in that, the outer cylinder (2b) has a raised edge (2b1) projecting out at an end thereof, the outer cylinder (2b) is covered with a platen (8), the platen (8) is connected with the fixed base (1) by means of a securing member (9), and the raised edge (2b1) is provided between the platen (8) and the fixed base (1).

7. The driving device for the belt axle of the winch as claimed in claim 5, characterized in that, the inner cylinder (2a) has a connection part matched with an internal diameter of the belt axle (3) at an end thereof, and the connection part of the inner cylinder (2a) is located within the belt axle (3).

8. The driving device for the belt axle of the winch as claimed in claim 2, characterized in that, the shift plate (10) have a spring seat (10a) for positioning the spring (5), one end of the said spring (5) is disposed at the spring seat (10a).

9. The driving device for the belt axle of the winch as claimed in claim 2, characterized in that, the rotary cylinder (2) includes an inner cylinder (2a) and an outer cylinder (2b), the inner cylinder (2a) is fixed within the outer cylinder (2b), said bar-shape slots (2a1) are positioned on both sides of the inner cylinder (2a), a baffle (4) is fixed within the inner cylinder (2a), and said insertion holes (2c) pass through both the inner cylinder (2a) and the outer cylinder (2b).

10. The driving device for the belt axle of the winch as claimed in Claim 9, characterized in that, the outer cylinder (2b) has a raised edge (2b1) projecting out at an end thereof, the outer cylinder (2b) is covered with a platen (8), the platen (8) is connected with the fixed base (1) by means of a securing member (9), and the raised edge (2b1) is provided between the platen (8) and the fixed base (1).

11. The driving device for the belt axle of the winch as claimed in claim 10, characterized in that, a seal ring (6) is disposed between the platen (8) and the outer cylinder (2b), a seal pad (7) is disposed between the platen (8) and the fixed base (1), a groove could be provided on an inner side of the platen (8), and said seal ring (6) is located at the groove of the platen (8).

12. The driving device for the belt axle of the winch as claimed in claim 9, characterized in that, the inner cylinder (2a) has a connection part matched with an internal diameter of the belt axle (3) at an end thereof, and the connection part of the inner cylinder (2a) is located within the belt axle (3).

* * * * *